(12) United States Patent
Loewenstern

(10) Patent No.: US 12,114,653 B2
(45) Date of Patent: Oct. 15, 2024

(54) PEST-CONTROL STRUCTURE FOR PHOTOVOLTAIC INSTALLATIONS

(71) Applicant: Solaredge Technologies Ltd., Herzeliya (IL)

(72) Inventor: Yakir Loewenstern, Ariel (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/986,257

(22) Filed: Nov. 14, 2022

(65) Prior Publication Data
US 2023/0155542 A1    May 18, 2023

Related U.S. Application Data

(60) Provisional application No. 63/279,318, filed on Nov. 15, 2021.

(51) Int. Cl.
| | |
|---|---|
| *A01M 29/30* | (2011.01) |
| *H02S 30/10* | (2014.01) |
| *H02S 40/00* | (2014.01) |
| *H02S 40/10* | (2014.01) |
| *H02S 20/23* | (2014.01) |

(52) U.S. Cl.
CPC ............. *A01M 29/30* (2013.01); *H02S 30/10* (2014.12); *H02S 40/00* (2013.01); *H02S 40/10* (2014.12); *H02S 20/23* (2014.12)

(58) Field of Classification Search
CPC ........ A01M 29/30; H02S 20/23; H02S 30/10; H02S 40/00; H02S 40/10
See application file for complete search history.

(56) References Cited

U.S. PATENT DOCUMENTS

| | | | | |
|---|---|---|---|---|
| 9,291,369 B2* | 3/2016 | West | ................. | F24S 25/61 |
| 10,897,223 B2* | 1/2021 | Stearns | ................. | H02S 20/23 |
| 11,309,831 B2* | 4/2022 | Crook | ................. | H02S 20/23 |
| 11,374,531 B2* | 6/2022 | Stearns | ................. | F24S 25/632 |
| 11,522,490 B2* | 12/2022 | Stearns | ................. | F24S 25/632 |
| 11,863,117 B2* | 1/2024 | Stearns | ................. | H02S 30/00 |
| 2012/0073220 A1* | 3/2012 | Kobayashi | ............ | F24S 25/636 |
| | | | | 52/173.3 |
| 2012/0301661 A1* | 11/2012 | West | ................. | F24S 40/10 |
| | | | | 428/99 |
| 2014/0158184 A1* | 6/2014 | West | ................. | H02S 20/23 |
| | | | | 136/251 |
| 2020/0099332 A1* | 3/2020 | Rossi | ................. | H02S 30/10 |
| 2020/0252023 A1* | 8/2020 | Stearns | ................. | H02S 30/10 |
| 2021/0167720 A1* | 6/2021 | Stearns | ................. | H02S 30/00 |

(Continued)

FOREIGN PATENT DOCUMENTS

| | | | |
|---|---|---|---|
| JP | 3174173 U | * | 3/2012 |
| JP | 2015123005 A | * | 7/2015 |

(Continued)

*Primary Examiner* — Jessie T Fonseca
(74) *Attorney, Agent, or Firm* — Banner & Witcoff, Ltd.

(57) ABSTRACT

A pest-control structure for a photovoltaic (PV) module installation may include a support beam mounted to a support surface. The support beam may include an interface surface. A PV module may be mounted to the support beam. At least one exclusion spacer may be mounted to the support beam at the interface surface or the PV module. The at least one exclusion spacer may restrict access to an area between the PV module and the support surface.

20 Claims, 13 Drawing Sheets

(56) References Cited

U.S. PATENT DOCUMENTS

| | | | | |
|---|---|---|---|---|
| 2021/0249990 A1* | 8/2021 | Rossi | ...................... | H02S 30/10 |
| 2021/0399680 A1* | 12/2021 | Crook | ...................... | H02S 20/23 |
| 2022/0247345 A1* | 8/2022 | Crook | ...................... | H02S 30/10 |
| 2023/0170840 A1* | 6/2023 | Stearns | ................... | H02S 20/23 |
| | | | | 52/173.3 |

FOREIGN PATENT DOCUMENTS

| | | | | |
|---|---|---|---|---|
| JP | 2018105002 A | * | 7/2018 | |
| JP | 2019058078 A | * | 4/2019 | |
| JP | 2019208451 A | * | 12/2019 | |
| JP | 2019216637 A | * | 12/2019 | |
| JP | 2023063076 A | * | 5/2023 | |
| WO | WO-2022025760 A1 | * | 2/2022 | |

* cited by examiner

PEST-CONTROL STRUCTURE FOR PHOTOVOLTAIC INSTALLATIONS

CROSS-REFERENCE TO RELATED APPLICATIONS

The present application is a non-provisional of U.S. Application No. 63/279,318, filed Nov. 15, 2021, the contents of which are incorporated herein by reference in their entirety for all purposes.

FIELD OF THE INVENTION

Aspects of this disclosure relate to photovoltaic (PV) module installations. In particular, one or more aspects of the disclosure relate to access-restricting, pest-control structures integrated with and easily attachable to a PV module installation.

BACKGROUND OF THE INVENTION

PV modules are frequently mounted on support surfaces, for example, home and office building roofs. Animals, such as birds, pigeons, mice, rats, squirrels, etc., commonly nest under installed PV modules between the modules and the support surfaces. Such animals may be destructive nuisances. Among other objectionable effects, such animals may damage PV module components and support structures. The animals may also cause damage to the roofs of homes and office buildings which may cause further costly damage to the underlying structures. Additionally, small animals nesting around PV modules may dirty the modules and lead to a decrease in PV module output efficiency and production.

Current solutions to these problems focus on retrofitting chicken wire or rabbit wire around installed PV modules. This solution is disadvantageous. Such retrofitting is time consuming and unattractive. Further, these solutions rely on the PV modules for support by either clipping or similarly attaching the wire to the modules. However, PV module sizes and dimensions vary, making this a cumbersome solution.

Additionally, PV module installations are frequently mounted on elevated structures subjecting them to high winds. Therefore, it is desirable that any structure that is attached or mounted to the PV module installation be robust enough to withstand high wind forces.

Therefore, improved apparatuses, systems and methods to address these shortcomings in the art are desired.

BRIEF SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a pest-control structure and system integrated with a photovoltaic (PV) module installation.

Aspects of the disclosure relate to an apparatus that includes a support beam configured to be mounted on a support surface, where the support beam may include a PV module mount surface and an interface surface disposed along at least one side of the support beam. The apparatus may further include an exclusion spacer coupled to the interface surface and disposed proximate to an outer edge of the PV module. The exclusion spacer may be configured to restrict access to an area between the PV module and the support surface.

According to one aspect, the apparatus may include a standoff connecting the interface surface and the exclusion spacer. In one configuration, the standoff may be adjustable in length.

According to another aspect, the exclusion spacer may include a top side proximate to the outer edge of the PV module, and a bottom side proximate to the support surface. In one configuration, the top side may be parallel to the bottom side. In another configuration, the top side may be angled relative to the bottom side.

According to another aspect, the interface surface may include a plurality fastener holes. The fastener holes may be at discrete locations along a side of the interface surface. In one configuration, a standoff may be disposed between, and connecting, the interface surface and the exclusion spacer, and the standoff may connect to the fastener holes with a press-fit connection within the fastener holes. In a further configuration, the fastener holes may be threaded and the standoff may connect to the fastener holes by threading a portion of the standoff into the fastener holes.

According to a further aspect, the interface surface may include an interface surface track. In one configuration, the exclusion spacer may be configured with a track engagement portion of complementary geometry to the interface surface track, which may engage the exclusion spacer with the interface surface track. According to a further aspect, the apparatus may include a standoff connecting the interface surface track and the exclusion spacer. In one configuration the standoff may include a support beam interface end, configured with complementary geometry to the interface surface track to engage with and couple to the interface surface track, and an exclusion spacer interface end configured to couple to the exclusion spacer. In one configuration the standoff may include a threaded through-hole, such that when the standoff is engaged with the interface surface track, the standoff may be secured to the interface surface track via the threaded through-hole. In one configuration, the exclusion spacer interface end of the standoff and the exclusion spacer may couple with each other with portions of complementary track geometries. In one configuration the exclusion spacer may include an exclusion spacer track and the exclusion spacer interface end may be configured to engage the exclusion spacer track.

According to yet a further aspect, the exclusion spacer may include a network of holes proximate the support surface. The exclusion spacer may be permeable to air and water.

According to a further aspect, the exclusion spacer may include a spray head disposed above a top surface of the PV module and may be directed at a portion of the PV module. The exclusion spacer may further include a channel configured to connect to deliver water to the spray head.

Further aspects of the disclosure may relate to a system. The system may include a support surface, a PV module and a support beam mounted on the support surface. The support beam may include a PV module mounting surface configured to mount the PV module, and an interface surface disposed along a side the support beam. The system may further include an exclusion spacer coupled to the interface surface and may be disposed proximate the outer edge of the PV module and may be configured to restrict access to an area between the photovoltaic module and the support surface. In one configuration, the support beam may be mounted to the support surface, the PV module may be mounted to the support beam, and the exclusion spacer may be mounted at least one of but not necessarily all of anterior, posterior, medial, or lateral to the photovoltaic module. In another aspect, the system may include a standoff disposed between, and connecting, the interface surface and the exclusion spacer.

According to further aspects, the interface surface may include a plurality of fastener holes along the interface surface, and the exclusion spacer may be coupled to the interface surface via one or more of the fastener holes. According to further aspects, the interface surface may include an interface surface track, and the exclusion spacer may be coupled to the interface surface via the interface surface track. According to further aspects, the system may further include a standoff. The standoff may engage the interface surface track at a standoff first end, and the exclusion spacer may be coupled to the standoff at a standoff second end. According to further aspects, the exclusion spacer may include a network of holes proximate to the support surface.

Further aspects of the disclosure relate to a method that includes mounting a support beam on a support surface, attaching a PV module to a PV mounting surface of the support beam, and connecting an exclusion spacer at an interface of the support beam. In one configuration, the exclusion spacer may be disposed along at least one side of the support beam such that the exclusion spacer inhibits access to an area between the PV module and the support surface.

According to another aspect, the method may further include attaching a standoff to the interface surface and connecting the exclusion spacer to the standoff. According to yet another aspect of the present disclosure the photovoltaic mounting surface and the interface surface may be the same surface, and connecting the exclusion spacer to the interface surface may include connecting the exclusion spacer to the PV mounting surface.

Further aspects of the disclosure relate to an apparatus that includes a support beam configured to be mounted on a support surface. The support beam may have a first surface configured to attach one or more exclusion spacer brackets, and may be configured to attach to and support a PV module. The apparatus may also include an exclusion spacer coupled to the one or more exclusion spacer brackets and may be disposed along an outer edge of the PV module and may be configured to restrict access to an area between the PV module and the support surface. In one configuration the one or more exclusion spacer brackets may be integral to, and formed as a part of, the exclusion spacer.

According to one aspect, the exclusion spacer may further include a closeable access opening configured to be opened following installation allowing access to the area between the photovoltaic module and the support surface. The closeable access opening may be configured to be reclosed, re-restricting access to the area between the PV module and the support surface.

According to one aspect, the exclusion spacer may include one or more voids configured to allow passage of the support beams orthogonal to the exclusion spacer. In one configuration, sizes and locations of the one or more voids may be adjustable along the length of the exclusion spacer.

Further aspects of the disclosure relate to a method that includes mounting a support beam on a support surface, attaching one or more exclusion spacer brackets to a support beam mounting surface, mounting a PV module on the support beam mounting surface, and attaching an exclusion spacer to the one or more exclusion spacer brackets.

Further aspects of the disclosure relate to an apparatus that includes a PV module mounted on a support surface, an interface frame disposed along at least one side of the PV module and including an interface surface, and an exclusion spacer coupled to at least a portion of the interface surface and disposed along the interface frame proximate to the at least one side of the PV module. The exclusion spacer may be configured to restrict access to an area between the PV module and the support surface.

According to one aspect, the apparatus may include one or more clips disposed between the interface frame and the exclusion spacer connecting the interface frame at the interface surface to the exclusion spacer.

According to another aspect, the exclusion spacer may include a network of holes proximate to the support surface wherein the exclusion spacer may be permeable to air and water.

According to yet another aspect, the exclusion spacer may be a pliable material. In one configuration the apparatus may include a retention member which may have a first surface mounted to the support surface and may be disposed along and proximate to a portion of the exclusion spacer, and may have a second surface where the exclusion spacer may be affixed to the second surface and retained by the retention member.

Further aspects of the disclosure relate to a method that includes mounting, to a support surface, a PV module which may have an interface frame disposed along at least one side of the PV module, and attaching an exclusion spacer to at least a portion of the interface frame.

Further aspects of the disclosure relate to a method that includes mounting a PV module to an interface surface, attaching an interface frame to at least one side of the PV module, and attaching an exclusion spacer to at least a portion of the interface frame.

Further aspects of the disclosure relate to an apparatus that includes a PV module mounted on a support surface, and an exclusion frame configured to fit over the mounted PV module. The exclusion frame may include at least one exclusion spacer side disposed along at least one side of the PV module. The exclusion spacer may be configured to restrict access to an area between the PV module and the support surface. In one configuration, the exclusion frame may be connected to the PV module.

According to one aspect, the apparatus may include a support beam configured to be mounted on the support surface. The support beam may have a PV mount surface configured to attach to and support a PV module, and an interface surface disposed along at least one side of the support beam. The exclusion frame may connect to the interface surface.

Further aspects of the disclosure relate to a PV module system that includes a photovoltaic module configured to mount to a support surface and an exclusion spacer disposed along at least one outer side of the PV module. The exclusion spacer may be configured to restrict access to an area between the PV module and the support surface.

Other features and advantages of the disclosure will be apparent from the following description taken in conjunction with the attached drawings.

BRIEF DESCRIPTION OF THE DRAWINGS

Some features of the present disclosure are illustrated by way of example, and not limitation, in the accompanying figures in which like reference numerals indicate similar elements and in which.

DETAILED DESCRIPTION

Figure 1:
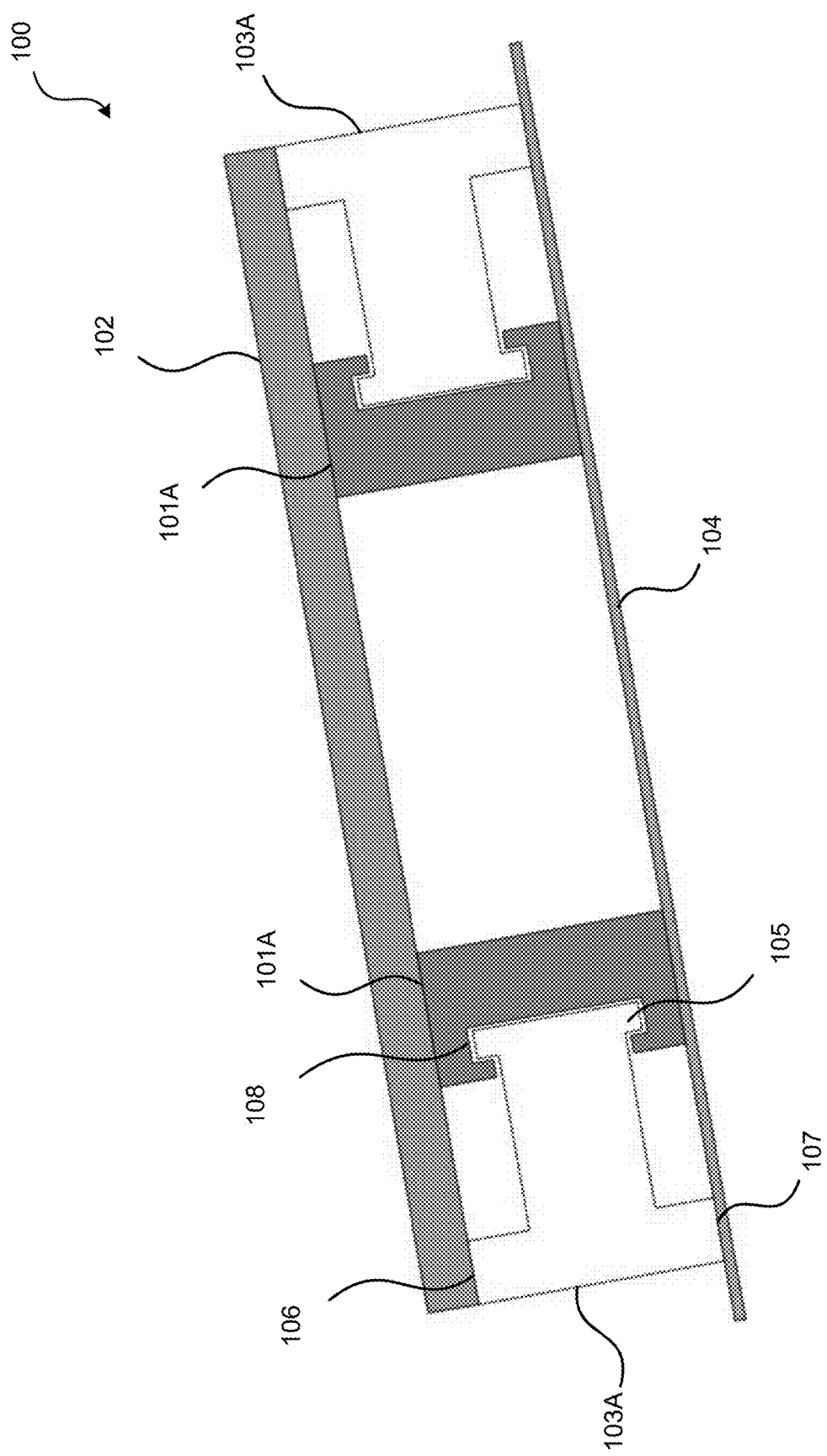
FIG. 1 is a section side view of an example pest-control structure with a photovoltaic (PV) module installation.

The accompanying drawings, which form a part hereof, show examples of the disclosure.

It is to be understood that the examples shown in the drawings and/or discussed herein are non-exclusive and that there are other examples of how the disclosure may be practiced.

Aspects of this disclosure relate to pest control structures and systems that may be integrated with photovoltaic (PV) module installations. FIG. 1 is a section side view of an example pest-control structure 100 with a photovoltaic (PV) module 102 installation. The pest-control structure 100 and/or system may include a track support beam 101A, a PV module 102 mounted to the support beam 101A, and a unitary track exclusion spacer 103A attached to the track support beam 101A. The pest-control structure 100 may be mounted, by the track support beam 101A, on a support surface 104. The support surface 104 may include, for example the roof of, a house, building, garage, outbuilding, barn, pergola, or any other surface suitable to support a PV module 102 installation.

Still referring to FIG. 1, the track support beams 101A may include an interface track 108. The interface track 108 may be disposed along one side, or any combination of all sides, of the track support beam 101A. The interface track 108 may span an entire side of the support beam 101A or may only be disposed on one or more portions of one or more sides of the track support beam 101A. The interface track 108 may include a socket profile, a plug profile, or a combination of both.

The unitary track exclusion spacers 103A may include track coupling portions 105 of complementary geometry to the interface track 108. The unitary track exclusion spacer 103A may couple with the track support beams 101A via the interface track 108 and track coupling portions 105 of the unitary track exclusion spacer 103A. The track coupling portion 105 may include a socket profile, a plug profile, or a combination of both. It is understood, that for examples of the present disclosure including a track coupling portion 105 with a socket profile, the interface track 108 may have a corresponding plug profile, and vice versa.

The unitary track exclusion spacer 103A may include threaded through-holes (not shown) through the portions of complementary geometry. A set screw may be tightened through the through-hole and against a surface (e.g., back surface of a socket profile track or front surface of a plug profile track) of the interface track 108, forcing the corresponding track profiles against one another and securing the unitary track exclusion spacer 103A to the interface track 108. According to other examples of the present disclosure, locks may be placed on the interface track on either side of the portions of complementary geometry, or on either side of the unitary track exclusion spacer 103A, thereby locking the unitary track exclusion spacer 103A in place. According to yet other examples of the present disclosure, screws or inserts may be inserted into a surface (e.g., back surface or front surface) of the interface track 108 on either side of a unitary track exclusion spacer 103A thereby securing the unitary track exclusion spacer 103A in place. Other methods of securing the unitary track exclusion spacer 103 to the interface track 108 will be appreciated by those of ordinary skill in the art and are contemplated herein.

Many examples of support beams 101A, 101B, etc. are provided herein and are generally referred to as support beams 101. According to certain examples of the present disclosure, a support beam 101 may be mounted directly to the support surface 104. alternatively, the support beam 101 may be mounted to brackets, or the like, which in turn may be mounted to the support surface 104. Any combination of support beam 101 mounting is contemplated herein.

The PV module 102 may be mounted on, and/or attached to, the support beam 101. In examples of the present disclosure where the pest-control structure 100 includes a plurality of support beams 101, the PV module 102 may be mounted to one or more of the plurality of support beams 101. The PV module 102 may be mounted to the support beams 101 using suitable hardware (e.g., clips, brackets, fasteners, connectors, screws etc.). Additionally or alternatively, the PV module 102 may be mounted to an intermediate element (e.g., extension beam, angle device, tilt mounts, brackets, clips, etc.) which may act as the support beam 101, or may be directly mounted to or integrally included with the support beam 101 or the support surface 104. Additionally or alternatively, the PV module 102 may be mounted in parallel with the support surface 104. The PV module 102 may be mounted at an angle in relation to the support surface 104.

Many examples of exclusion spacers 103A, 103B, 103C, etc. are provided herein and are generally referred to as exclusion spacer 103. The exclusion spacer 103 may restrict the access of small animals (e.g., pigeons, mice, rats, squirrels, etc.) to an area between the PV module 102 and the support surface 104. The pest-control structure 100 may include one or more exclusion spacers 103. The exclusion spacers 103 may be attached to one of, all of, or any combination of proximal, superior, anterior, posterior, medial, lateral, distal, or inferior to the support beam 101.

The exclusion spacers 103 may be fabricated out of any material suitable for obstructing small animals (e.g., pigeons, mice, rats, squirrels, etc.). Such materials may include, but are not limited to, metals, plastics, vinyls, polymers, composites, rubber, nylon, nylon mesh etc. The exclusion spacer 103 may be made of compressible material, which may facilitate obstruction to the area between the PV module 102 and the support surface 104. The exclusion spacer 103 may be constructed out of a pliable material. The exclusion spacer 103 may be fabricated as a PV module 102. Additionally, the exclusion spacer 103 may be coated with, or impregnated with animal repellent or rodenticide.

The exclusion spacer 103 may further be fabricated of thermally conductive material. Such materials may include but are not limited to copper, gold, aluminum nitride, silicon carbide, aluminum, tungsten, graphite, zinc, brass, steel, bronze, etc. or any combination therein. The exclusion spacer 103 maybe fabricated out of an alloy of thermally conductive materials. The exclusion spacer may further contain heatsink fins disposed on its surface. Such heatsink fins may be fabricated in any number of ways known to those of ordinary skill in the art and, as not limiting examples, include: pin fins, straight fins, flared fins, square wavy fins, V wavy fins, offset fins, etc. An exclusion spacer 103, among other appearances, may be fabricated or finished to resemble the support surface 104, the PV module 102, the PV module 102 frame, the support beams 101, the standoffs 401, and/or the mounting hardware, proximate to which the exclusion spacer 103 is attached.

FIGS. 1-8 show exclusion spacers 103 with heights that correspond to heights of the support beam 101. In other examples of the present disclosure, and as discussed above, the support beam 101 may be mounted on brackets or other mounting devices and hardware so as to impact the height of the support beam 101 on the support surface 104. Additionally, support beams 101 and PV modules 102 may be mounted on uneven or undulating surfaces. Accordingly, in some examples of the present disclosure, the exclusion spacer 103 may be taller or shorter than the support beam 101 to span the gap between the PV module 102 and the support surface 104.

The PV module 102 may be installed on an angle with respect to the support surface 104. In such examples, and others, the exclusion spacer 103 may be wedge shaped, tapered, curved, or any other shape suitable to span the gap between the PV module 102 and the support surface 104. The exclusion spacer 103 may include a top surface 106 (proximate the PV module 102) and a bottom surface 107 (proximate the support surface 104). The top surface 106 may form an angle with respect to the bottom surface 107. Additionally or alternatively, the angle of the top surface 106 to the bottom surface 107 may be formed with respect to any coordinate plane. Additionally or alternatively, the top surface 106 and the bottom surface 107 may be parallel to one another. The top surface 106 and bottom surface 107 of the exclusion spacer 103 may be adjustable with respect to one another in height and angle. Further, a pest control structure 100 may include multiple exclusion spacers 103 in multiple different shapes and sizes. As discussed above, support beams 101 and PV modules 102 may be installed on undulated or corrugated support surfaces 104. In such examples, and others, the exclusion spacer 103 may include at least one undulated or corrugated surface. All combinations of shapes, sizes and patterns of exclusion spacer 103 are contemplated herein.

According to some examples of the present disclosure, the exclusion spacer 103 may be fabricated with access doors or panels. The access doors or panels may be opened before or after the exclusion spacer 103 is installed. The access doors or panels may allow access to the area between the PV module 102 and the support surface 104 after the exclusion spacer has been installed. Further, the access doors or panels may allow access to the support beams 101. The access doors or panels may subsequently be closed re-restricting access to the area between the PV module 102 and the support surface 104. A majority of the length of the exclusion spacer 103 may act as the access door or panel. Alternatively, the exclusion spacer 103 may include one or multiple access doors or panels along a length of the exclusion spacer 103.

As described above, the exclusion spacers 103 may be installed on the sides of (e.g., laterally and medially to) the support beams 101 or PV module 102. The support beams 101 may pass through the exclusion spacer 103. In order to allow for the support beams 101 to pass through a portion of the exclusion spacer 103, while still restricting access to the area between the PV module 102 and support surface 104, the exclusion spacer 103 may include cutouts or voids. The cutouts or voids may be sized similarly to the width of the support beams 101. The cutouts or voids may allow the through passage of the support beams 101 either orthogonal to the exclusion spacer 103 or at an angle to the exclusion spacer 103. The cutouts or voids may be fabricated into the exclusion spacer 103. Additionally or alternatively, the exclusion spacer 103 may have snap out, or otherwise removeable, sections to accommodate the through passage of the support beams 101.

Figure 2:
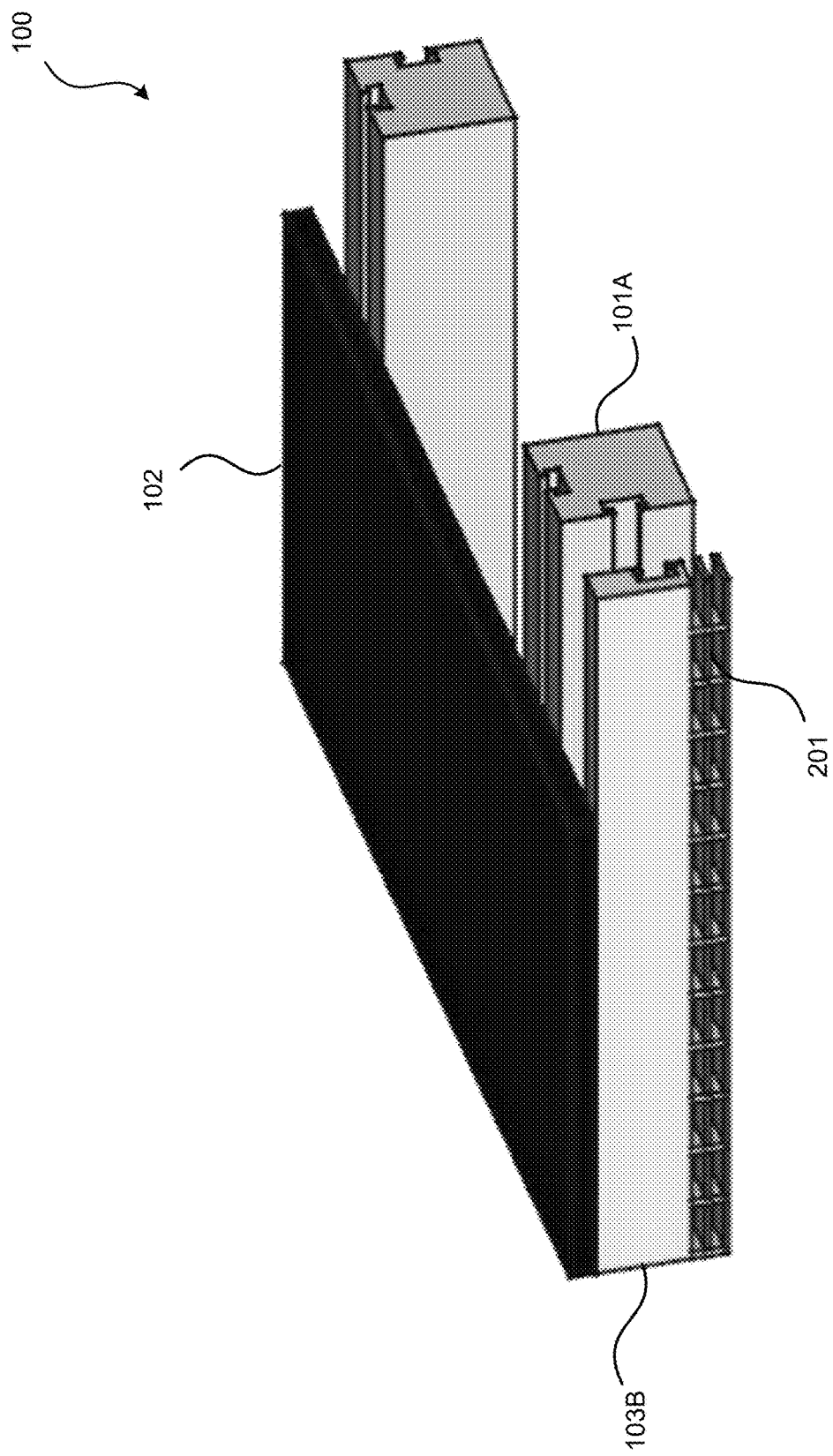
FIG. 2 is a perspective view of an example pest-control structure with a PV module installation.

FIG. 2 is a perspective view of an example pest-control structure 100 with a PV module 102 installation. The pest-control structure may include a permeable exclusion spacer 103B with a network of holes 201 (e.g., a mesh). The holes 201 may allow the permeable exclusion spacer 103B to be permeable to air, water, and small debris, while still restricting small animals. The holes 201 may span the entire permeable exclusion spacer 103 body, or only a portion of the exclusion spacer 103B body. For example, FIG. 2 shows the holes 201 spanning a lower portion of the permeable exclusion spacer 103B body. Additionally, the holes 201 may include different shapes, sizes, patterns, and layouts.

It is understood that any exclusion spacer 103 described in this specification may contain a network of holes 201 as described above rendering the exclusion spacer 103 permeable to air and water.

Figure 3:
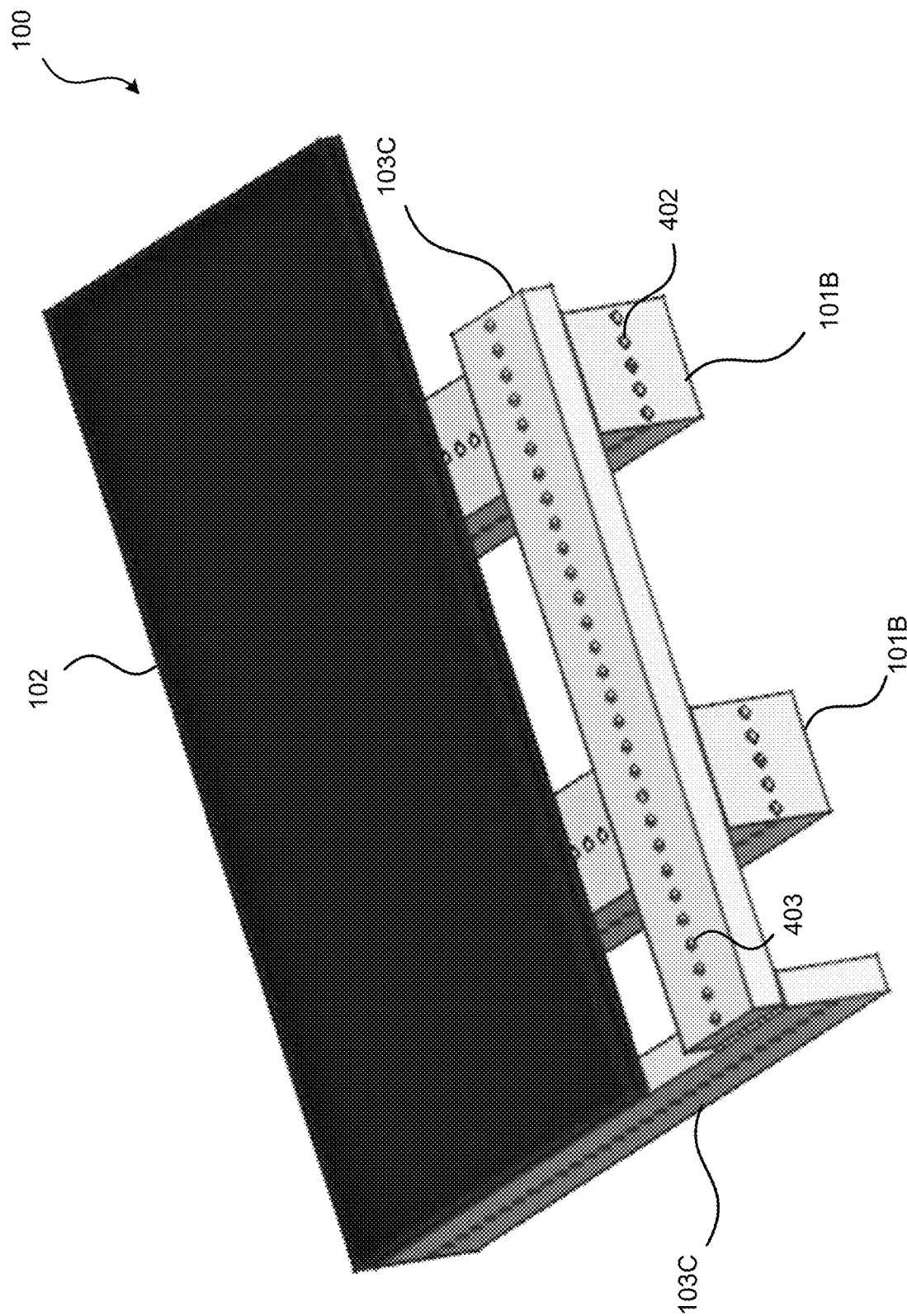
FIG. 3 is a section side view of a portion of an example pest-control structure with a PV module installation.

FIG. 3 is a section side view of an example pest-control structure 100 with a PV module 102 installation. The pest-control structure 100 may include one or more fastener hole exclusion spacers 103C, and fastener hole support beams 101B. Referring to FIG. 3, a fastener hole exclusion spacer 103C may be connected to a fastener hole support beam 101B.

Figure 4:
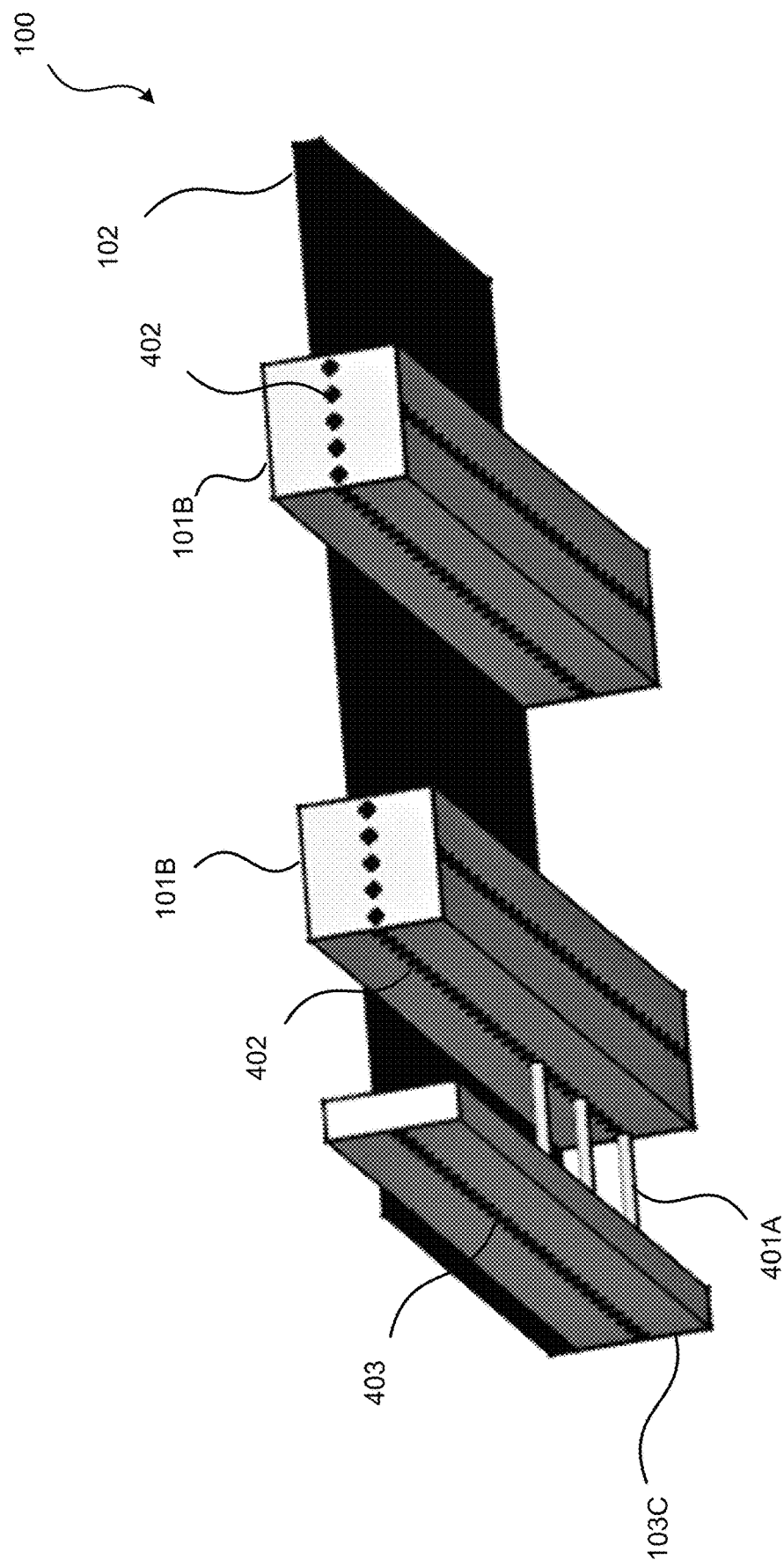
FIG. 4 is a perspective view of an example pest-control structure with a PV module installation.

FIG. 4 is a perspective view of an example pest-control structure 100 with a PV module 102 installation. The pest-control structure may include one or more fastener hole exclusion spacers 103C. The fastener hole exclusion spacer 103C may be connected to a fastener hole support beam 101B, for example, with pin standoffs 401A. The pin standoffs 401A may be disposed between the fastener hole exclusion spacer 103C and the fastener hole support beam 101B.

Multiple examples of standoffs, 401A, 401B, etc., are provided herein and are generally referred to as standoffs 401. The standoffs 401 may serve to attach the exclusion spacers 103 to the support beams 101. Additionally or alternatively, the standoffs 401 may act to facilitate connection between the exclusion spacer 103 and the support beam 101. Additionally or alternatively, the standoffs 401 may serve only to suitably distance the exclusion spacer 103 from the support beam 101 such that access is restricted to the desired area. The standoffs 401 may serve one or more of the above functions: to connect, to facilitate connection between, and to properly distance the exclusion spacer 103 and the support beam 101.

A standoff 401, among other appearances, may be fabricated or finished to resemble the support surface 104, the PV module 102, the PV module 102 frame, the support beams 101, the exclusion spacers 103, and/or the mounting hardware, proximate to which the standoff 401 is attached.

Referring to FIG. 4, the fastener hole support beams 101B may include one or more support beam fastener holes 402 or apertures in discrete locations on the fastener hole support beam 101B. The support beam fastener holes 402 may be situated along the length of one or more sides of the fastener hole support beam 101B. The support beam fastener holes 402 may fall on a single axis along the length of the fastener hole support beam 101B. Alternatively, the support beam fastener holes 402 may fall at varying heights along the length of the fastener hole support beam 101B. A fastener hole support beam 101B may also include support beam fastener holes 402 on its ends. The fastener hole support beams 101B may be manufactured to include support beam fastener holes 402, or support beam fastener holes 402 may be custom drilled or tapped into fastener hole support beams 101B.

It is understood that fastener hole support beams 101B may include interface tracks 108 as described above in reference to FIG. 1. It is further understood that track support beams 101A may include support beam fastener holes 402 as described above. Any combination of interface tracks 108, support beam fastener holes 402 and support beam 101 sides are contemplated herein.

Still referring to FIG. 4, the fastener hole exclusion spacer 103C may contain one or more exclusion spacer fastener holes 403 or apertures in discrete locations on the fastener hole exclusion spacer 103C. The fastener hole exclusion spacer 103C may contain one or more exclusion spacer fastener holes 403. The exclusion spacer fastener holes 403 may be situated along the length of one or more sides of the fastener hole exclusion spacer 103C. The exclusion spacer fastener holes 403 may be on a single axis along the length of the fastener hole exclusion spacer 103C. Additionally or alternatively, the exclusion spacer fastener holes 403 may be at varying heights along the length of the fastener hole exclusion spacer 103C. A fastener hole exclusion spacer 103C may also have exclusion spacer fastener holes 403 on its ends. The fastener hole exclusion spacer 103C may be manufactured with exclusion spacer fastener holes 403, or exclusion spacer fastener holes 403 may be custom drilled or tapped into the fastener hole exclusion spacers 103C.

Figure 5:
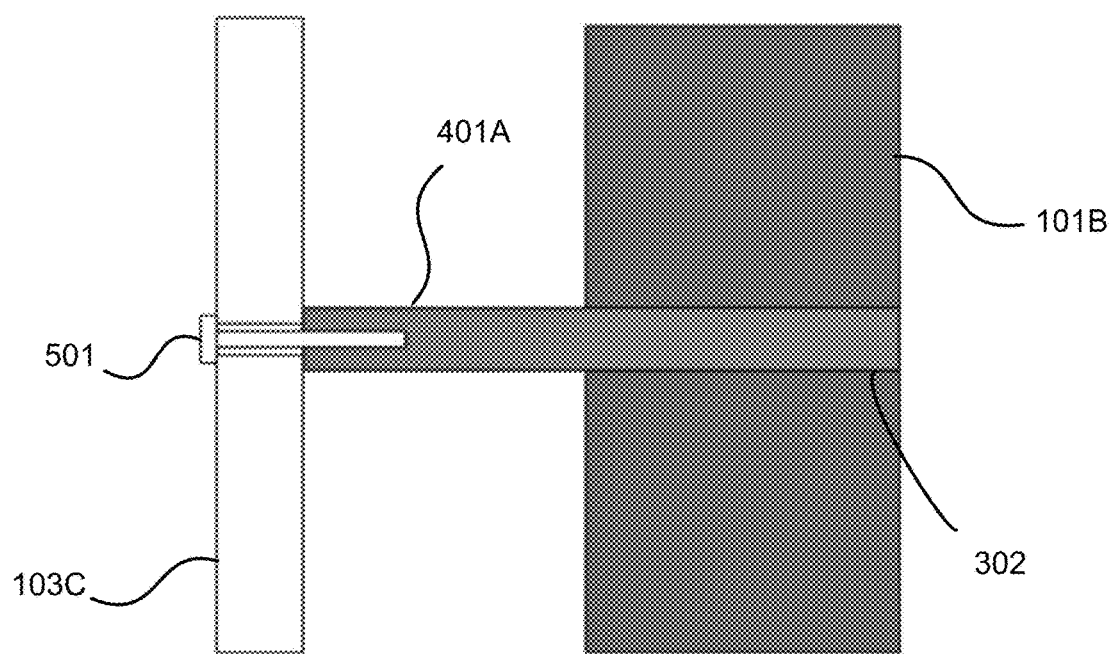
FIG. 5 is a section view of a portion of an example pest-control structure.

FIG. 5 is a section side view of a portion of an example pest-control structure 100. Referring to FIG. 5, a pin standoff 401A may be used to connect a fastener hole exclusion spacer 103C to a fastener hole support beam 101B. The pin standoffs 401A may connect to the support beam fastener holes 402. The pin standoffs 401A may press-fit into the support beam fastener holes 402. Additionally or alternatively, the support beam fastener holes 402 may be threaded and the pin standoffs 401A may thread into the support beam fastener holes 402. Screw 501 may connect the fastener hole exclusion spacer 103C with the pin standoffs 401A. Additional types of connectors, e.g., pins, bolts, nuts, machine screws, self-tapping screws, rivets, pins, may alternatively connect the fastener hole exclusion spacer 103C with the pin standoffs 401A. Any suitable method of mating such bodies known to those of ordinary skill in the art is contemplated herein.

Figure 6:
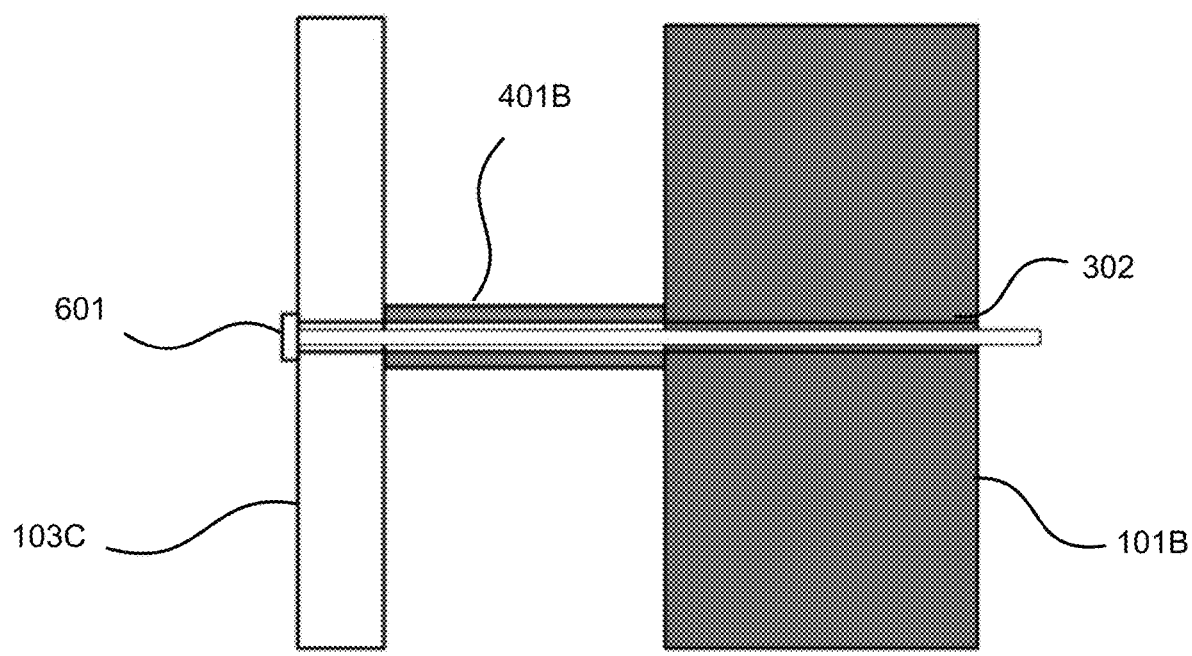
FIG. 6 is a section view of a portion of an example pest-control structure.

FIG. 6 is a section side view of a portion of an example pest-control structure 100. Referring to FIG. 6, the pest-control structure may include a spacer standoff 401B between a fastener hole exclusion spacer 103C and fastener hole support beam 101B. The spacer standoff 401B may facilitate connection of the fastener hole exclusion spacer 103C to the fastener hole support beam 101B. Additionally or alternatively, the spacer standoff 401B may properly distance the fastener hole exclusion spacer 103C from the fastener hole support beam 101B such that access is restricted to the desired area. Bolt 601 may be used with the spacer standoffs 401B to connect the fastener hole exclusion spacer 103C to the fastener hole support beam 101B. Further, additional types of connectors, e.g., screws, machine screws, self-tapping screws, pins, may alternatively be used with the spacer standoffs 401B. Any suitable method of mating such bodies and known to those of ordinary skill in the art is contemplated herein.

Exclusion spacers 103 may be connected with, or connected to standoffs 401. The exclusion spacer 103 may contain press-fit pins which may press-fit into a standoff 401 aperture. The exclusion spacer 103 press-fit pins may be integral to the exclusion spacer 103. Additionally or alternatively, the pin standoffs 401A may press-fit into the exclusion spacer holes 201 in the fastener hole exclusion spacer 103C.

As discussed herein, the exclusion spacers 103 may be connected to standoffs 401 or support beams 101. The exclusion spacer 103 may be connected to the support beams 101 or the standoffs 401 in a quick-release manner, for example, using quick-release pins, quick-disconnect couplings, etc. According to such examples, and others, the exclusion spacer 103 may be quickly and easily removed from, and returned to, a PV module 102 installation which may promote ease of access to the support beams and the area between the PV module 102 and the support surface.

Standoffs 401 may function primarily as spacing devices. In such configurations the standoff 401 may act as a spacer between a support beam 101 and an exclusion spacer 103 ensuring proper installation location of the exclusion spacer 103 relative to the support beam 101. The standoff 401 may have a through-hole, and a bolt 601 may pass from the outside of the exclusion spacer 103, through the exclusion spacer 103, and the standoff 401, and may be secured at the support beam 101.

It is understood that the above-mentioned fastening and distancing methods between the pin standoff 401A and the fastener hole support beam 101B, between the pin standoff 401A and the fastener hole exclusion spacer 103C, between the spacer standoff 401B and the fastener hole support beam 101B, and between the spacer standoff 401B and the fastener hole exclusion spacer 103C are not restricted to the above discussion or accompanying drawings. Rather, any combination of fastening and spacing methods discussed herein or otherwise known in the art may be used alone or in any combination.

Figure 7:
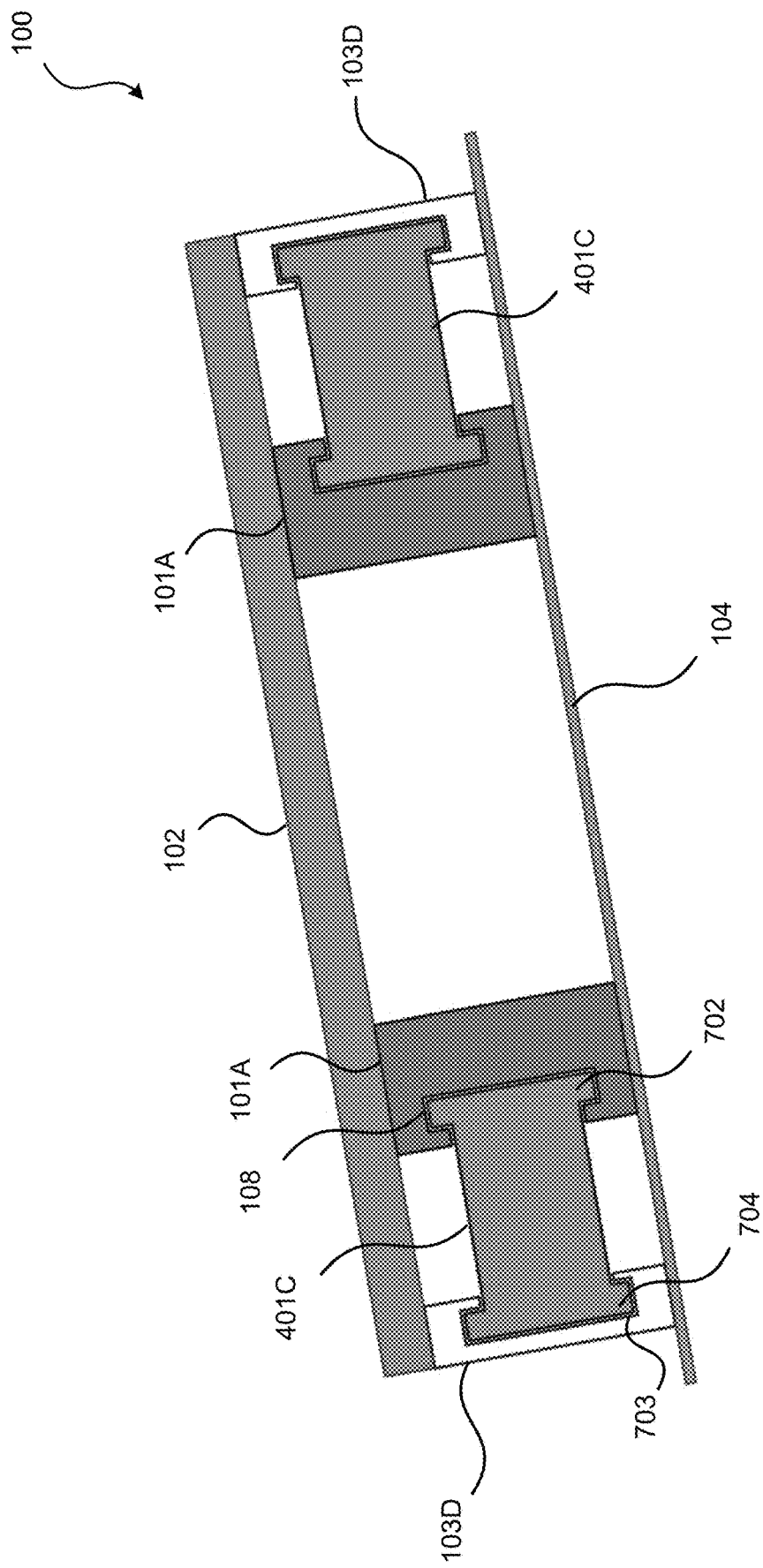
FIG. 7 is a section side view of an example pest-control structure with a PV module installation.
Figure 8:
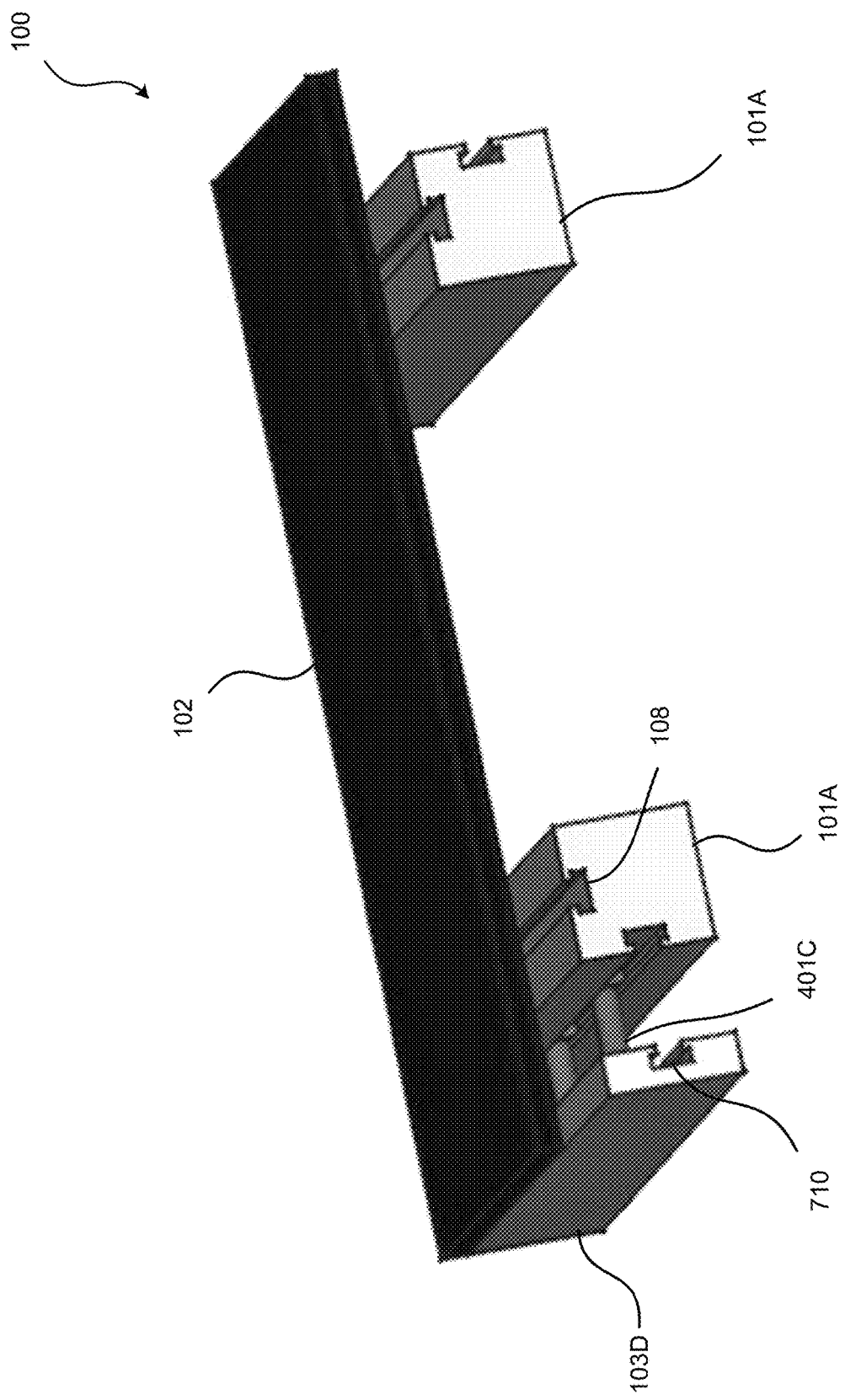
FIG. 8 is a perspective view of an example pest-control structure with a PV module installation.

FIGS. 7-8 show examples of additional example exclusion spacers 103, standoffs 401, and support beams 101.

FIG. 7 is a section side view of an example pest-control structure 100 with a PV module 102 installation. Referring to FIG. 7, the pest-control structure 100 and/or system may include a double track standoff 401C. The double track standoff 401C may space and/or connect a track exclusion spacer 103D to a track support beam 101A. FIG. 8 is a perspective view of an example pest-control structure 100 with a PV module 102 installation. As discussed above in reference to FIG. 1, the track support beams 101A may include at least one interface track 108. The interface track 108 may be disposed along one side (e.g., see FIG. 1), or any combination of all sides, of the track support beam 101A (e.g., see FIG. 8). The interface track 108 may span an entire side of the track support beam 101A or may only be disposed on portions of a side of the track support beam 101A. The interface track 108 may include a socket profile, a plug profile, or a combination of both. In examples of the present disclosure, a track support beam 101A may have a combination of interface tracks 108 and support beam fastener holes 402.

Referring again to FIG. 7, and as discussed above, the pest-control structure 100 may use double track standoffs 401C which may be disposed between the track support beams 101A and the track exclusion spacers 103D. The double track standoffs 401C may at one end connect to the interface track 108, and at a second end connect to the track exclusion spacer 103D. To facilitate connection with the interface track 108, the double track standoff 401C may include an interface track coupling form 702. The interface track coupling form 702 may include portions of complementary geometry to the interface track 108, such that the interface track coupling forms 702 and the interface track 108 fit within, around, and/or engage one another. The interface track coupling forms 702 may include a socket profile, a plug profile, or a combination of both. It is understood that for examples of the present disclosure including an interface track coupling form 702 with a socket profile, the interface track 108 may have a corresponding plug profile, and vice versa.

Still referring to FIG. 7, the track exclusion spacer 103D may include an exclusion spacer track 703. The exclusion spacer track 703 may include complementary geometry to an exclusion track coupling form 704 of the double track standoffs 401C such that the exclusion track coupling forms 704 and the exclusion spacer track 703 may fit within, around, and/or engage one another, thereby coupling the track exclusion spacer 103D with the double track standoff 401C. In examples of the present disclosure, the exclusion spacer track 703, like the exclusion track coupling forms 704, may include a socket profile, a plug profile, or a combination of both. It is understood that for examples of the present disclosure including an exclusion spacer track 703 with a socket profile, the exclusion track coupling forms 704 may have a corresponding plug profile, and vice versa.

The double track standoffs 401C may act to facilitate connection between the track exclusion spacer 103D and the track support beam 101A. Alternatively, the double track standoffs 401C may serve only to properly distance the track exclusion spacer 103D from the track support beam 101A such that access is restricted to the desired area. The double track standoffs 401C may serve one or more of the above functions, which may include, for example, to connect, to facilitate connection between, and/or to properly distance the track exclusion spacer 103D and the track support beam 101A. Any of the above-mentioned methods of attaching and spacing regarding track exclusion spacers 103D and track support beams 101A may be utilized independently or may be utilized together in any combination in single applications.

Standoffs 401 may include two track ends (e.g., track standoff 401D). Additionally or alternatively, standoffs may include two pin ends (e.g., pin standoff 401A). Additionally or alternatively, standoffs 401 may include one track end and one pin end, a track end and a receiving hole end, a pin end and a receiving hole end (e.g., FIG. 5), or two receiving hole ends (e.g., FIG. 6). The previous mentioned configurations are mere examples, all configurations of the above connecting methods, and those not mentioned but known in the art, are contemplated herein in any combination.

Figure 9:
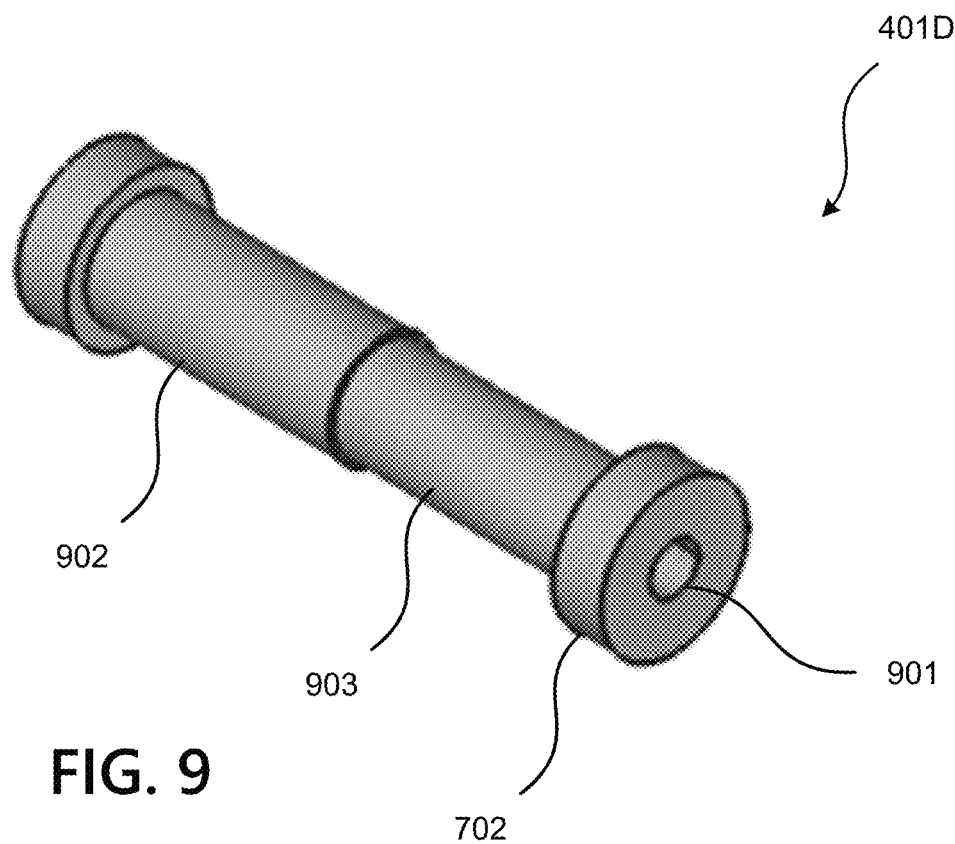
FIG. 9 is an isometric view of an example adjustable through-hole track standoff.

FIG. 9 is an isometric view of an example adjustable through-hole track standoff 401D. The adjustable through-hole track standoff 401D may include two track ends. The adjustable through-hole track standoff 401D may include a through-hole 901. The through-hole 901 may be threaded. In such examples, when the adjustable through-hole track standoff 401D is coupled with the interface track 108, a set screw may be inserted through the through-hole 901 and against a surface (e.g., back surface of a socket profile track or front surface of a plug profile track) of the interface track 108, thereby forcing the corresponding track profiles against one another and securing the through-hole track standoff 401D in place.

Referring to standoffs 401 having track profiles generally, as described above with reference to FIG. 9, set screws may be inserted through the standoffs 401 and tightened against a surface of the interface track 108 profile, thereby locking the standoff 401 in place. Additionally or alternatively, locks may be placed on either side of the standoffs 401 and engaged with and secured to the interface track 108 and/or the exclusion spacer track, thereby locking the standoffs 401 in place. Additionally or alternatively, screws may be inserted into a surface (e.g., front or back) of the interface track 108 profile and/or the exclusion spacer track 703 profile on either side of the standoffs 401 thereby securing the standoffs 401 in place. Other methods of securing the standoffs 401 to the interface track 108 and the exclusion spacer track 703 will be appreciated by those of ordinary skill in the art and are contemplated herein.

Referring again to FIG. 9, the adjustable through-hole track standoff 401D may be adjustable in length. The adjustable through-hole track standoff 401D may be constructed of two parts, an outer part 902 and an inner part 903 slideably engaged with the outer part 902. The length of the adjustable through-hole track standoff 401D may be adjusted by sliding the ends of the inner part 903 and outer part 902 towards or away from one another. The length of the adjustable through-hole track standoff 401D may then be locked. For example, a set screw may be threaded through a wall of the outer part 902. The set screw may be tightened against the inner part 903 thereby locking the inner part 903 in relation to the outer part 902, and locking the length of the standoff 401.

As a further example, the outer part 902 and inner part 903 may have a linear ratcheting relationship. The outer part 902 and inner part 903 may ratchet and click into place as the two parts are slid in relation to one another. The adjustable through-hole track standoff 401D may have graduated markings indicating the length of the adjustable through-hole track standoff 401D at each graduation.

It is understood, that standoff 401 adjustability is not restricted to adjustable through-hole track standoffs 401D. Rather, all configurations of standoffs 401 described in this disclosure may be adjustable and lockable as described in reference to FIG. 9 or may be otherwise adjustable as would be appreciated by a person skilled in the art. Further, all configurations of standoffs 401 described in this disclosure may be fixed. Additionally, all adjustable standoffs 401 may contain graduations as described above.

PV modules 102 may be rectangular. As such, PV modules may be variously oriented in different installations. For example, in some installations PV modules 102 may be oriented in portrait (with the long edge of the PV module 102 disposed orthogonal to the support beams 101). In other installations, PV modules 102 may be oriented in landscape (with the short edge of the PV module 102 orthogonal to the support beams 101). Additionally, varying installations may compel differently sized PV modules 102. As it can be appreciated, in different installations, the distance from the support beam 101 to the PV module 102 edge, where an exclusion spacer 103 may be installed, may vary. Therefore, the use of adjustable standoffs 401 may be useful. Such adjustable standoffs 401 may allow installers to install exclusion spacers 103 variously spaced from support beams 101 while utilizing a single part.

Figure 10:
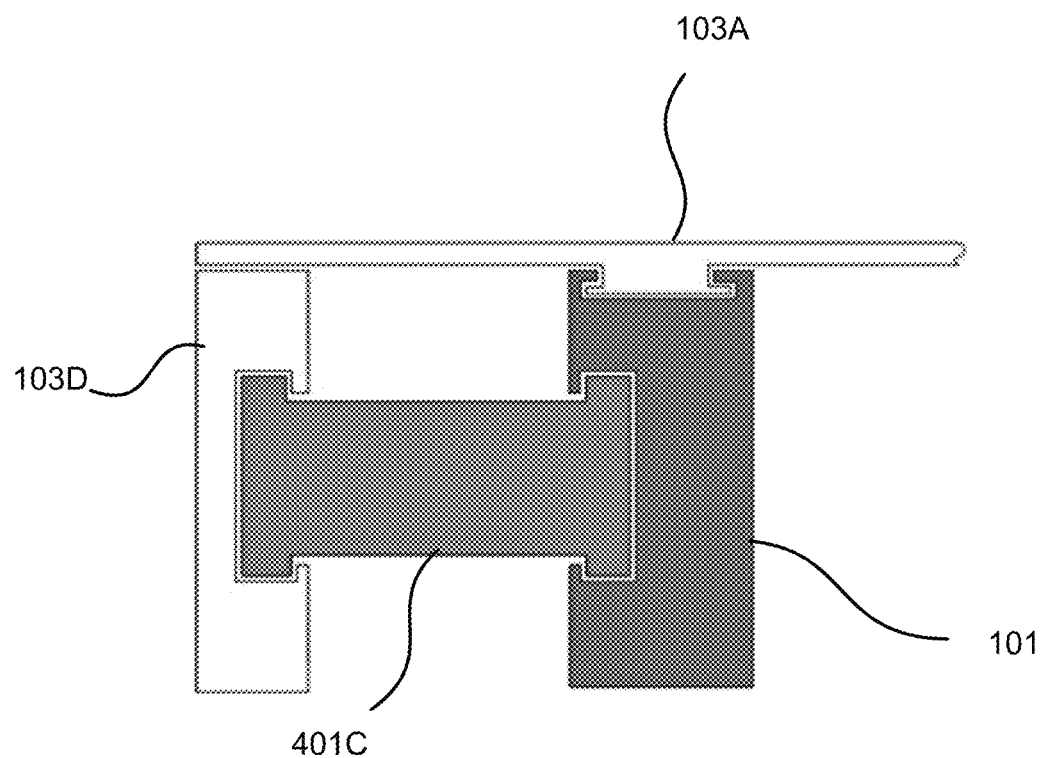
FIG. 10 is a section side view of a portion of an example pest-control structure.

FIG. 10 is a section side view of a portion of an example pest-control structure 100 integrated with a PV module 102 installation. Referring to FIG. 10 the pest-control structure 100 and/or system may include a double track standoff 401C, a track exclusion spacer 103D and a unitary track exclusion spacer 103A. Thus, with reference to FIG. 10, it will be appreciated that a single pest-control structure 100 may contain multiple shapes, sizes and styles of exclusion spacers 103. Further, as discussed above, methods of attachment between exclusion spacers 103 and support beams 101 may differ between multiple exclusion spacers 103 in a single pest-control structure and/or system. Such methods of attachment are not limited to those illustrated in FIG. 10, but may refer to any standoff and method of attachment described herein or otherwise known to those skilled in the art.

Figure 11:
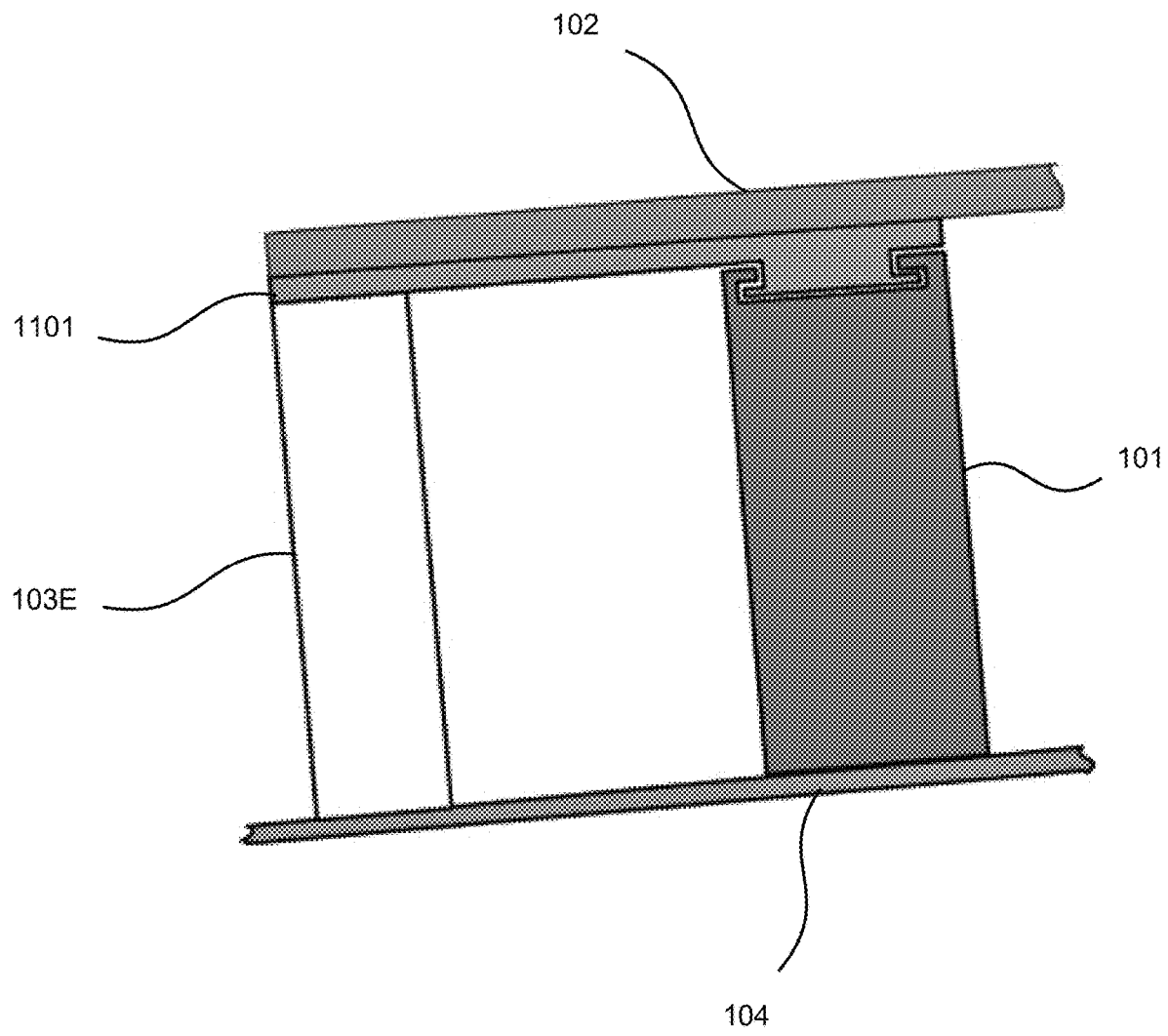
FIG. 11 is a section side view of a portion of an example pest-control structure with a PV module installation.

Further configurations for integrating the pest-control structure with a PV module installation may be appreciated by those skilled in the art without departing from the scope of the present disclosure. FIG. 11 is a section side view of a portion of an example pest-control structure 100 with a PV module 102 installation. Referring to FIG. 11, the pest-control structure 100 and/or system may include an exclusion spacer bracket 1101 mounted to the same surface as a PV module 102. A bracket attached exclusion spacer 103E, situated anterior, posterior, medial, lateral, proximal, distal, superior, or inferior to the support beam 101, may be attached to the support beam 101 via an exclusion spacer bracket 1101. The exclusion spacer bracket 1101 may be installed on the same surface as the PV module 102 or beneath the PV module 102 where the PV module 102 may be installed on top of the exclusion spacer bracket 1101. The exclusion spacer bracket 1101 may be disposed under the PV module 102 and connected to the PV module 102 at a first surface and connected to the support beam 101 at a second surface different than the first surface. The bracket attached exclusion spacer 103E may be attached to the exclusion spacer bracket 1101 restricting access to the area of the support surface 104 between the PV module 102 and the support surface 104. The bracket attached exclusion spacer 103E and the exclusion spacer bracket 1101 may be formed of a single, integral part. Any suitable method of attachment, as contemplated herein or otherwise appreciated by those skilled in the art, are contemplated with respect to the exclusion spacer bracket 1101 and the support beam 101. The exclusion spacer bracket 1101 may be adjustable in length or fixed in length.

Figure 12:
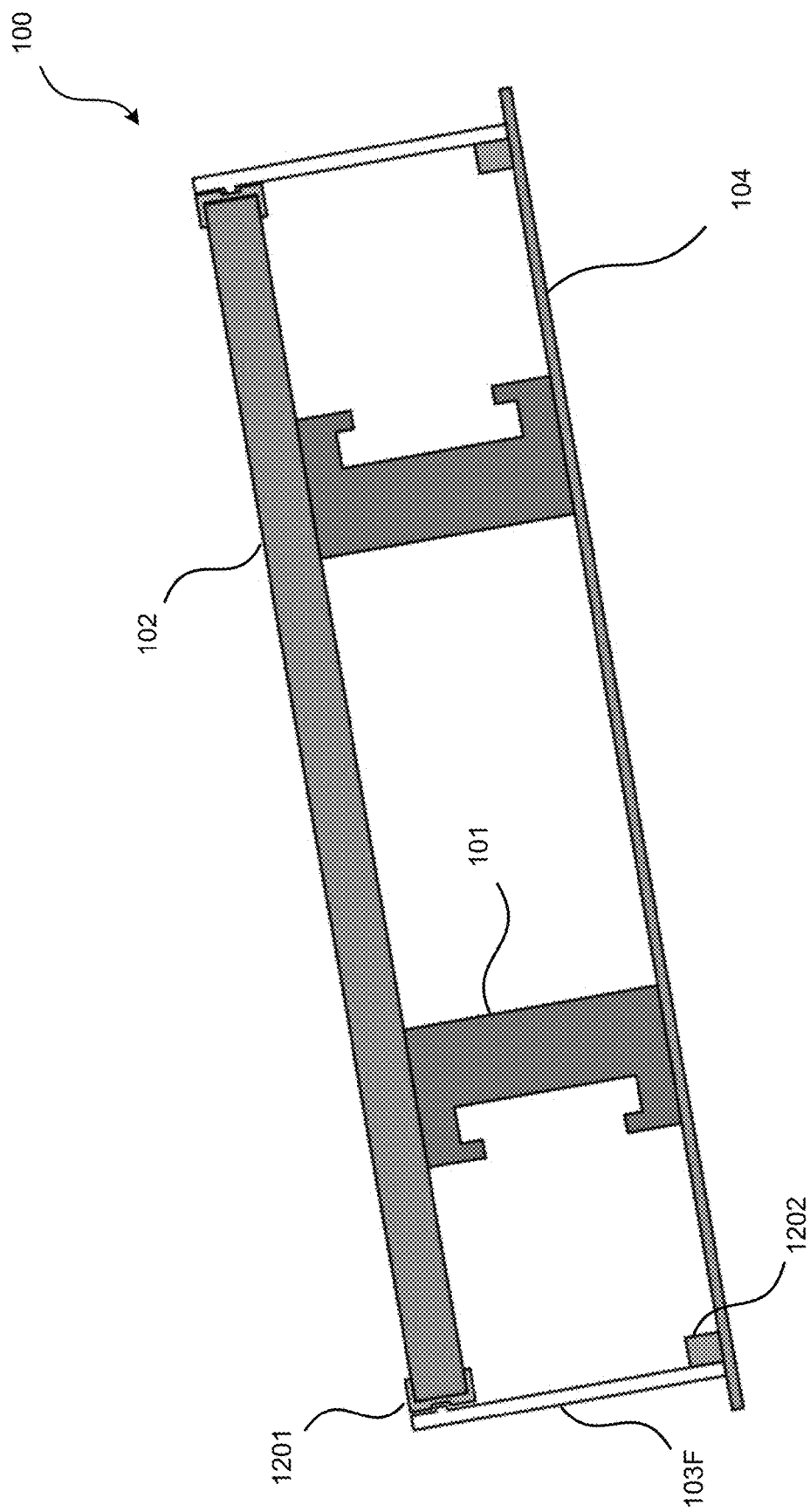
FIG. 12 is a section side view of an example pest-control structure with a PV module installation.

FIG. 12 is a section side view of a pest-control structure 100 integrated with a PV module 102 installation. Referring to FIG. 12, the pest-control structure 100 and/or system may include a frame mounted exclusion spacers 103F, interface frames 1201, and retention members 1202. The interface frame 1201 may be disposed along one, all, or any combination of sides of the PV module 102. The interface frame 1201 may be disposed along an entire side of the PV module 102, or portions of the interface frame 1201 may be disposed at single or multiple discrete locations along a side of the PV module 102. The PV module 102 may be manufactured with the interface frame 1201. Additionally or alternatively, the interface frame 1201 may be added to an already manufactured PV module 102. The frame mounted exclusion spacer 103F may interface with and connect to the interface frame 1201. The frame mounted exclusion spacer 103F may connect to the frame using, for example, clips, screws, clamps, rivets, adhesives, pins, tracks, or any suitable method of joining two bodies and/or any of the other joining methods described herein. The frame mounted exclusion spacer 103F may connect to the interface frame 1201 along a length of the interface frame 1201, or to any number of discrete locations along the length of the interface frame 1201.

Still referring to FIG. 12, the frame mounted exclusion spacer 103F may be formed of a non-pliable, or a pliable material. Examples of pliable frame mounted exclusion spacers 103F may include but are not limited to rubber, vinyl, nylon, nylon mesh etc. Where the frame mounted exclusion spacer 103F is formed of a pliable material, the frame mounted exclusion spacer 103F may take the form of a skirt around one or more sides of the PV module 102. In such examples, the frame mounted exclusion spacer 103F may benefit from retention on the support surface 104. Such retention may be realized via a retention member 1202. The retention member 1202 may be rigidly installed to the support surface 104 or the support beams 101. The retention member 1202 may be disposed along a portion of the length of the exclusion spacer 103. The exclusion spacer 103 may be connected to the retention member 1202 thereby retaining the exclusion spacer 103 against the retention member 1202.

Figure 13:
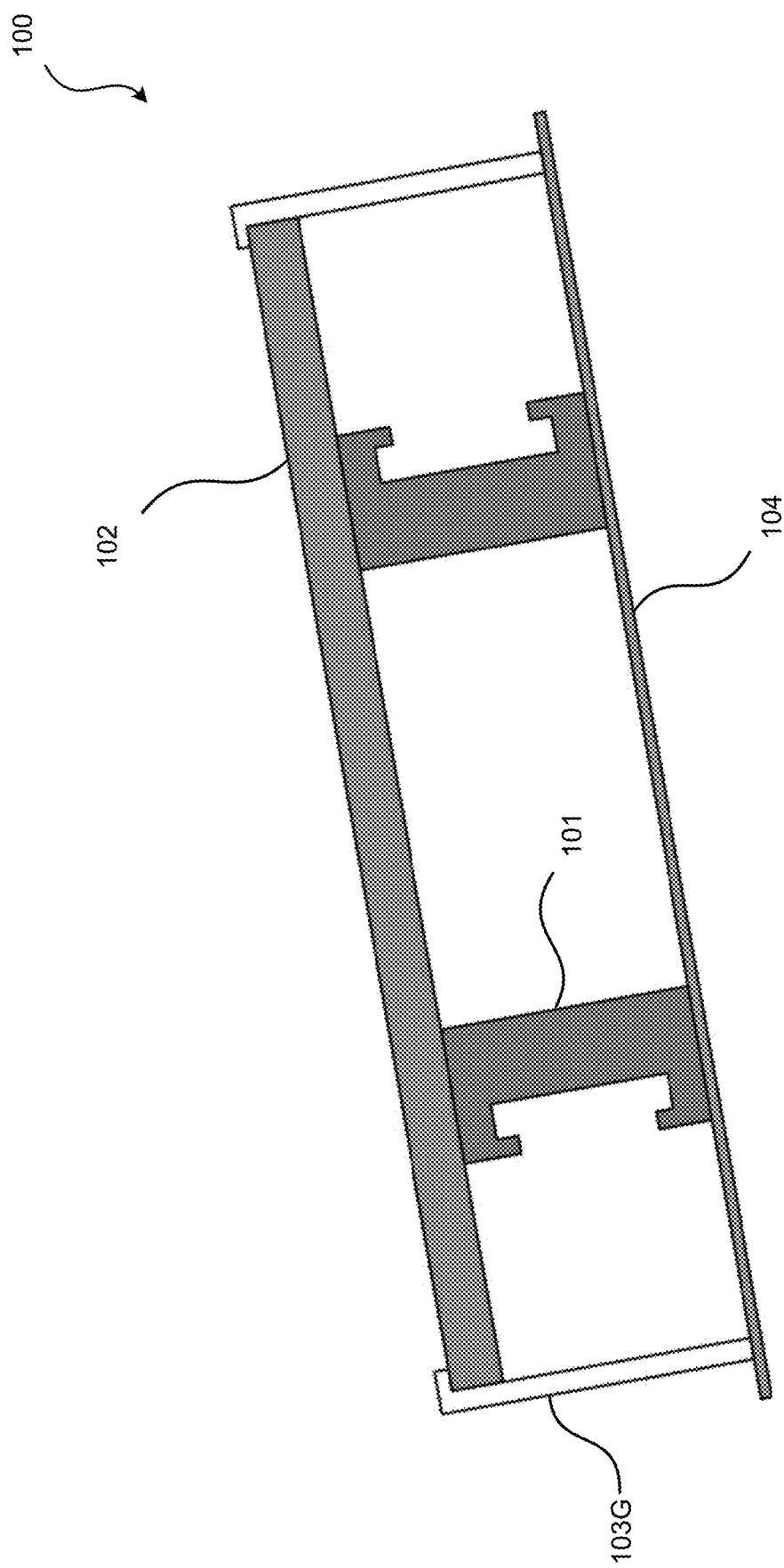
FIG. 13 is a section side view of an example pest-control structure with a PV module installation.

FIG. 13 is a section side view of an example pest-control structure 100 with a PV module 102 installation. Referring to FIG. 13, the pest-control structure 100 and/or system may include frame exclusion spacers 103G in the form of drop-in frames. The frame exclusion spacer 103G may be in the form of a preformed drop-in frame. The frame exclusion spacer 103G may be placed over the top of an installed PV module 102. The frame exclusion spacer 103G may be connected and secured to either one, all, or a combination of the support beams 101, the PV module 102, and/or the support surface 104. The frame exclusion spacer 103G may include an exclusion elongation (e.g., extending to the support surface 104) on one, all, or any combination of sides of the PV module 102.

Figure 14:
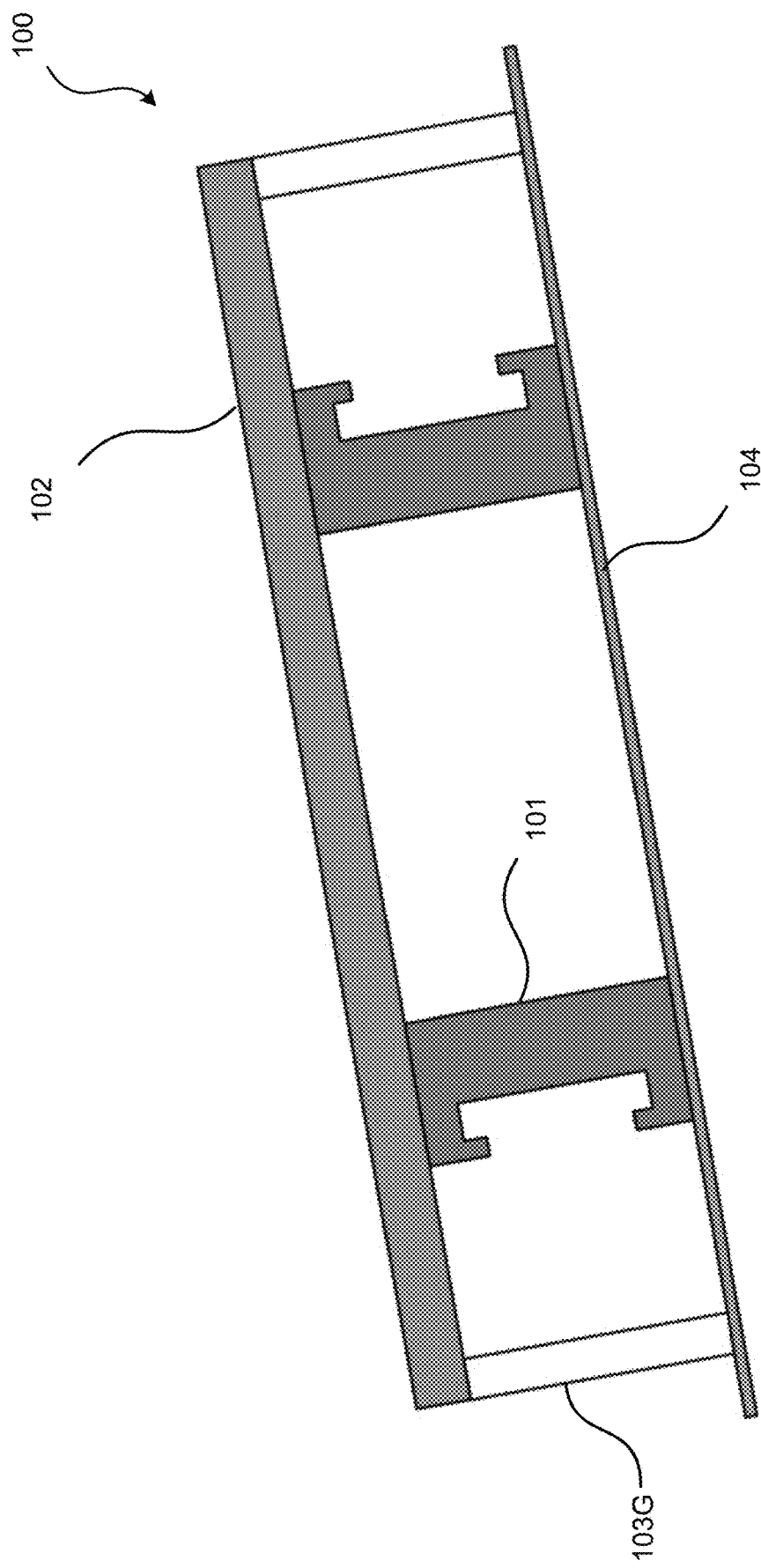
FIG. 14 is a section side view of an example pest-control structure with a PV module installation.

FIG. 14 is a section side view of a pest-control structure 100 with a PV module 102 installation. Referring to FIG. 14, the pest-control structure 100 and/or system may include integral exclusion spacers 103H, integral to a PV module 102. Accordingly, the integral exclusion spacer 103H may be built into the PV module 102. The integral exclusion spacer 103H may be integral to the PV module 102 and may additionally provide support and/or rigidity to the PV module 102 installation.

Figure 15:
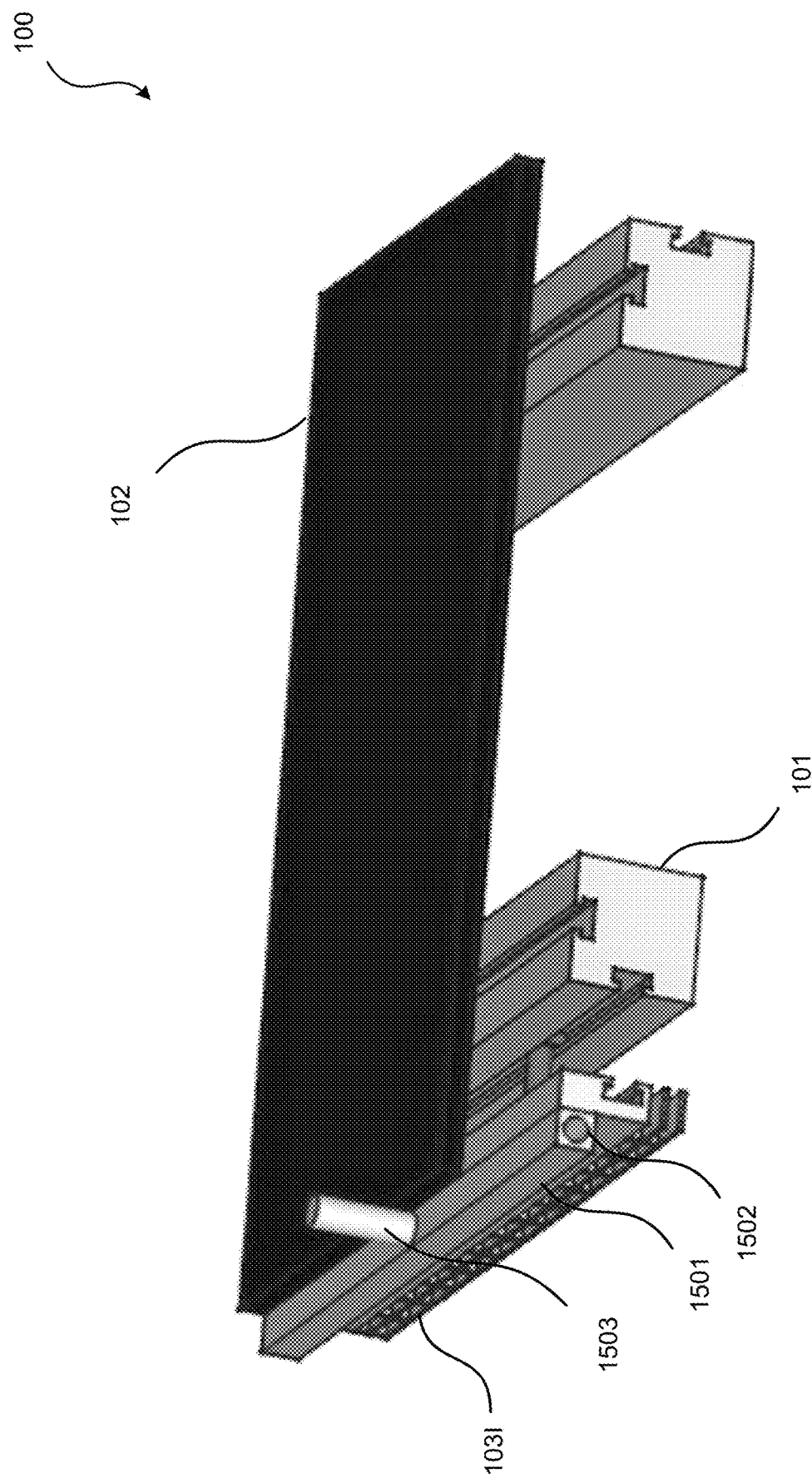
FIG. 15 is a perspective view of an example pest-control structure with a PV module installation.

FIG. 15 is a perspective view of a pest-control structure 100 with a PV module 102 installation. Referring to FIG. 15, the pest control-structure 100 and/or system may include a water delivery exclusion spacer 103I comprising a water delivery system 1501. The pest-control structure 100, and more particularly, the water delivery exclusion spacer 103I, may include a PV module 102 cleaning system. The water delivery exclusion spacer 103I may include a water delivery system 1501. The water delivery system 1501 may include at least a water channel 1502, an inlet, an outlet, and a spray head 1503 on each water delivery exclusion spacer 103I. Each water delivery exclusion spacer 103I may not have each element of the water delivery system 1501. For example, some water delivery exclusion spacers 103I may include only an inlet and an outlet, or only an inlet. The spray head 1503 may be removeable and adjustable and disposed above the PV module 102. The spray head 1503 may be adjustable with regards to the spray pattern, spray arc, and water flow. The spray heads 1503 may be interchangeable where, for example, they may be removed and replaced with differently performing spray heads 1503. One spray head 1503 may be able to cover multiple PV modules 102 in an array of PV modules 102. Therefore, spray heads may not be included with every exclusion spacer 103. Spray heads 1503 may be removed and a plug may be inserted in their stead. The water delivery system 1501 may be expandable such that the inlets and outlets may be coupled to create various configurations. The outlets may also be plugged at the end of a water delivery system run.

The cleaning system may work along with, or separate from, a monitoring system. The monitoring system may monitor the cleanliness of an array of PV modules 102 and notify a user when the array, or a portion thereof, requires cleaning. The monitoring system may monitor the PV modules 102 (e.g., the power output of the PV modules) to establish a baseline when the PV modules 102 are new or after they have been cleaned. The monitoring system may adjust for the time of year and the height of the sun in the sky. According to examples of the present disclosure, the monitoring system may determine whether a particular PV module 102 requires cleaning. The monitoring system may include PV module output production and efficiency in its determination. The monitoring system may notify the user when a cleaning threshold is reached. The threshold may include the instance when one panel is extremely dirty, or when a percentage of panels reach a cleaning threshold. The monitoring system may account for variables such as tree limb shading, structure shading, etc., so that the baseline may be adjusted during a shaded part of the day. The system may notify the homeowner when a cleaning is need and may offer to send a cleaning service. According to examples of the present disclosure, the monitoring and cleaning systems may work in tandem. In such examples, the monitoring system may notify the user when portions of a PV module 102 array require cleaning. The monitoring system may work with the cleaning system to target those portions of the array that require cleaning.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting. Terms such as "top," "bottom," "front," "back," "side," "rear," "proximal," distal," "anterior," "posterior," "lateral," "medial," and the like, as used herein, are intended for descriptive purposes only and do not limit the disclosure in any way.

What is claimed is:

1. An apparatus comprising:
a support beam configured to be mounted on a support surface, the support beam comprising a photovoltaic module mount surface and an interface surface disposed along at least one side of the support beam; and
an exclusion spacer coupled to the interface surface and configured to be disposed proximate to an outer edge of a photovoltaic module and to restrict access to an area between the photovoltaic module and the support surface,
wherein the exclusion spacer further comprises:
a spray head configured to be disposed above a top surface of the photovoltaic module and to be directed at a portion of the photovoltaic module; and
a channel configured to deliver water to the spray head.

2. The apparatus of claim 1, further comprising a standoff connecting the interface surface and the exclusion spacer and spacing the exclusion spacer from the interface surface.

3. The apparatus of claim 2, wherein the standoff is adjustable in length.

4. The apparatus of claim 1, wherein the interface surface comprises a plurality of fastener holes.

5. The apparatus of claim 1, wherein the interface surface comprises an interface surface track.

6. The apparatus of claim 5, wherein the exclusion spacer is configured with a track engagement portion having complementary geometry to the interface surface track, to engage the exclusion spacer with the interface surface track.

7. The apparatus of claim 5, further comprising a standoff connecting the interface surface track and the exclusion spacer, the standoff comprising:
a support beam interface end comprising complementary geometry to the interface surface track to engage with and couple to the interface surface track; and
an exclusion spacer interface end configured to couple to the exclusion spacer.

8. The apparatus of claim 7, wherein the exclusion spacer comprises an exclusion spacer track and wherein the exclusion spacer interface end is configured to engage the exclusion spacer track.

9. The apparatus of claim 7, wherein the standoff further comprises a threaded through-hole, such that when the standoff is engaged with the interface surface track, the standoff is secured to the interface surface track via the threaded through-hole.

10. The apparatus of claim 1, wherein the exclusion spacer further comprises a network of holes configured to be proximate the support surface.

11. A system comprising:
a support surface;
a photovoltaic module;
a support beam mounted on the support surface comprising a photovoltaic module mounting surface configured to mount the photovoltaic module, and an interface surface disposed along a side of the support beam; and
an exclusion spacer coupled to the interface surface and disposed proximate to an outer edge of the photovoltaic module, and configured to restrict access to an area between the photovoltaic module and the support surface, the exclusion spacer comprising:

a spray head disposed above a top surface of the photovoltaic module and directed at a portion of the photovoltaic module; and
a channel configured to deliver water to the spray head.

12. The system of claim 11, further comprising a standoff disposed between and connecting the interface surface and the exclusion spacer.

13. The system of claim 11, wherein the interface surface comprises a plurality of fastener holes along the interface surface, and wherein the exclusion spacer is coupled to the interface surface via one or more of the fastener holes.

14. The system of claim 11, wherein the interface surface comprises an interface surface track, and wherein the exclusion spacer is coupled to the interface surface via the interface surface track.

15. The system of claim 14, further comprising a standoff, wherein the standoff engages the interface surface track at a standoff first end, and the exclusion spacer is coupled to the standoff at a standoff second end.

16. The system of claim 11, wherein the exclusion spacer comprises a network of holes proximate to the support surface.

17. A method comprising:
mounting a support beam on a support surface,
attaching a photovoltaic module to a photovoltaic mounting surface of the support beam; and
connecting an exclusion spacer at an interface surface of the support beam such that the exclusion spacer restricts access to an area between the photovoltaic module and the support surface,
wherein the exclusion spacer further comprises:
a spray head disposed above a top surface of the photovoltaic module and directed at a portion of the photovoltaic module; and
a channel configured to deliver water to the spray head.

18. The method of claim 17, further comprising:
attaching a standoff to the interface surface; and
connecting the exclusion spacer to the standoff.

19. The method of claim 17, wherein the exclusion spacer further comprises a network of holes proximate to the support surface.

20. The method of claim 17, wherein the interface surface comprises a plurality of fastener holes.

* * * * *